US012638566B2

(12) United States Patent
Homan et al.

(10) Patent No.: US 12,638,566 B2
(45) Date of Patent: May 26, 2026

(54) SENSOR CALIBRATION TOOL

(71) Applicant: Crown Equipment Corporation, New Bremen, OH (US)

(72) Inventors: Adam J. Homan, Minster, OH (US); Pierce McGowan, Minster, OH (US); Dustin H. Lumadue, Bellefontaine, OH (US); Kevin J. Bruns, Maria Stein, OH (US); Matthew A. Niekamp, Celina, OH (US); Jeremy Koppenhaver, Botkins, OH (US); Michael Willoby, Quincy, OH (US)

(73) Assignee: Crown Equipment Corporation, New Bremen, OH (US)

( * ) Notice: Subject to any disclaimer, the term of this patent is extended or adjusted under 35 U.S.C. 154(b) by 775 days.

(21) Appl. No.: 18/167,137

(22) Filed: Feb. 10, 2023

(65) Prior Publication Data

US 2024/0272289 A1     Aug. 15, 2024

(51) Int. Cl.
| | |
|---|---|
| *G01S 7/497* | (2006.01) |
| *B66F 9/075* | (2006.01) |
| *G01S 7/481* | (2006.01) |
| *G01S 17/88* | (2006.01) |

(52) U.S. Cl.
CPC .......... *G01S 7/4972* (2013.01); *B66F 9/0755* (2013.01); *G01S 7/481* (2013.01); *G01S 17/88* (2013.01)

(58) Field of Classification Search
CPC ........ G01S 7/4972; G01S 7/481; G01S 17/88; B66F 9/0755
See application file for complete search history.

(56) References Cited

U.S. PATENT DOCUMENTS

| | | | |
|---|---|---|---|
| 6,583,868 | B2 | 6/2003 | Hopfenmuller |
| 7,121,011 | B2 | 10/2006 | Murray et al. |
| 7,424,387 | B1 | 9/2008 | Gill et al. |
| 9,134,120 | B2 | 9/2015 | Schommer et al. |
| 9,170,101 | B2 | 10/2015 | Stieff |
| 9,279,670 | B2 | 3/2016 | Schommer et al. |
| 9,933,515 | B2 | 4/2018 | Prokhorov |
| 10,323,936 | B2 | 6/2019 | Leikert |
| 11,009,586 | B2 | 5/2021 | Zack et al. |
| 11,175,381 | B2 | 11/2021 | Wang et al. |

(Continued)

FOREIGN PATENT DOCUMENTS

| | | |
|---|---|---|
| CN | 110031812 A | 7/2019 |
| CN | 213582248 U | 6/2021 |

(Continued)

*Primary Examiner* — Jamil Ahmed
(74) *Attorney, Agent, or Firm* — Stevens & Showalter LLP

(57) ABSTRACT

A tool for calibrating a sensor is provided. The tool includes an elongate rail structure including a first end and a second end, wherein a direction of elongation of the rail structure is defined in a lateral direction between the first and second ends. A first plate element extends from the rail structure at least partially in a first direction that is transverse to the lateral direction, and a second plate element extends from the rail structure at least partially in the first direction and is spaced apart from the first plate element in the lateral direction. An alignment member extends from the rail structure at least partially in the first direction, the alignment member being located between the first and second plate elements.

20 Claims, 13 Drawing Sheets

(56)          References Cited

U.S. PATENT DOCUMENTS

| | | |
|---|---|---|
| 11,279,327 B1 | 3/2022 | Jackson |
| 11,325,597 B2 | 5/2022 | Qiu et al. |
| 11,465,632 B2 | 10/2022 | Corghi |
| 11,570,422 B2 | 1/2023 | Hannes |
| 11,591,033 B2 | 2/2023 | Govekar et al. |
| 2019/0331482 A1* | 10/2019 | Lawrence .......... G01B 11/2755 |
| 2020/0273206 A1 | 8/2020 | Corghi |
| 2021/0146942 A1 | 5/2021 | Hrabe et al. |
| 2021/0181324 A1 | 6/2021 | Sergeev |
| 2021/0215811 A1 | 7/2021 | Couture et al. |
| 2022/0057198 A1 | 2/2022 | Massie et al. |
| 2022/0191468 A1 | 6/2022 | Kolberg |
| 2022/0194399 A1 | 6/2022 | Corghi |
| 2022/0221556 A1 | 7/2022 | Elliott et al. |
| 2022/0228860 A1 | 7/2022 | Ohmori et al. |
| 2023/0001996 A1 | 1/2023 | Matsumoto et al. |

FOREIGN PATENT DOCUMENTS

| | | |
|---|---|---|
| CN | 113324496 A | 8/2021 |
| CN | 113758473 A | 12/2021 |
| CN | 215494114 U | 1/2022 |
| CN | 112396665 B | 10/2022 |
| DE | 19927573 C1 | 9/2000 |
| DE | 19857871 C1 | 10/2000 |
| DE | 102004026044 B3 | 12/2005 |
| DE | 102009009046 A1 | 10/2009 |
| DE | 102011120535 A1 | 6/2013 |
| DE | 212018000298 U1 | 6/2020 |
| EP | 2113787 A1 | 11/2009 |
| EP | 1813965 A3 | 12/2009 |
| EP | 2818890 A2 | 12/2014 |
| EP | 3771922 A1 | 2/2021 |
| JP | 2019051786 A | 4/2019 |
| WO | 2017016541 A1 | 2/2017 |
| WO | 2017198264 A1 | 11/2017 |
| WO | 2018153722 A1 | 8/2018 |
| WO | 2020010043 A1 | 1/2020 |
| WO | 2020147723 A1 | 7/2020 |
| WO | 2021185537 A1 | 9/2021 |
| WO | 2021198268 A1 | 10/2021 |

* cited by examiner

FIG. 14
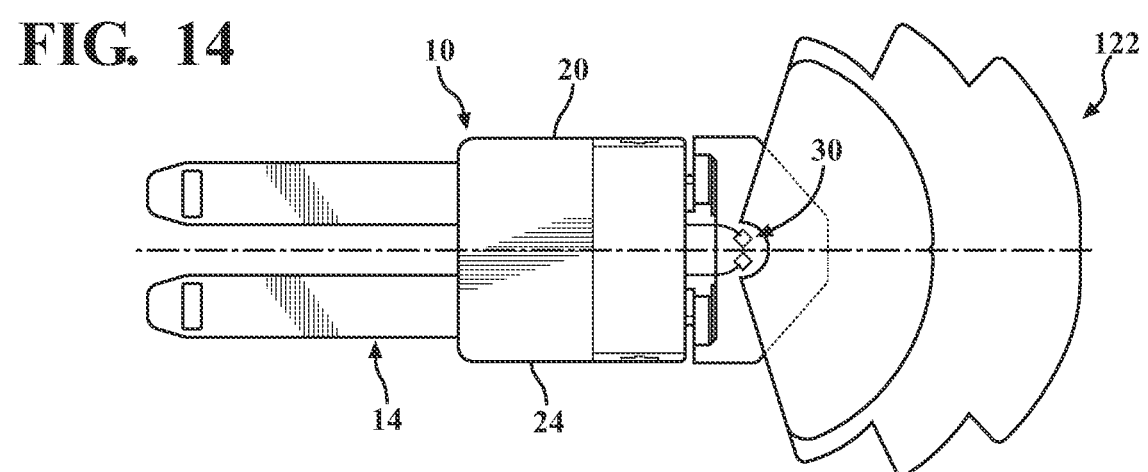
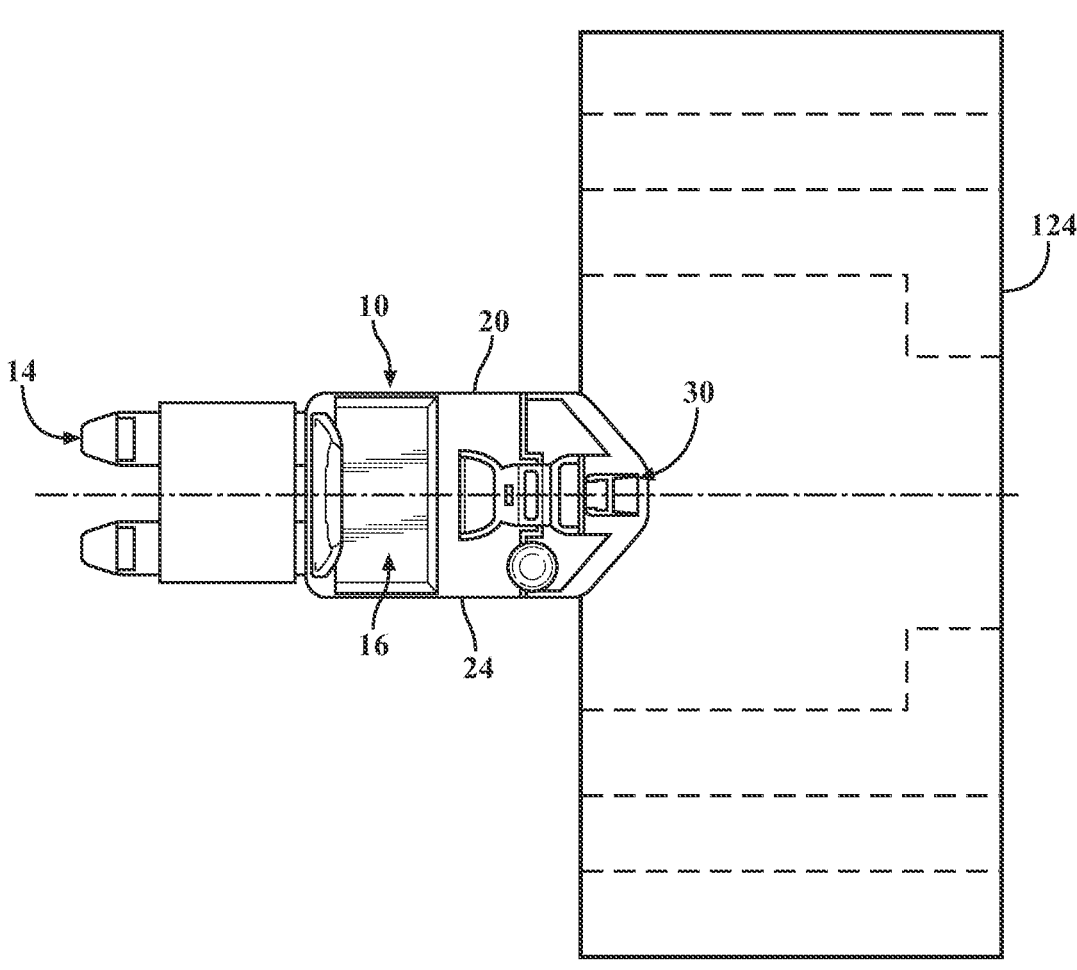
FIG. 15

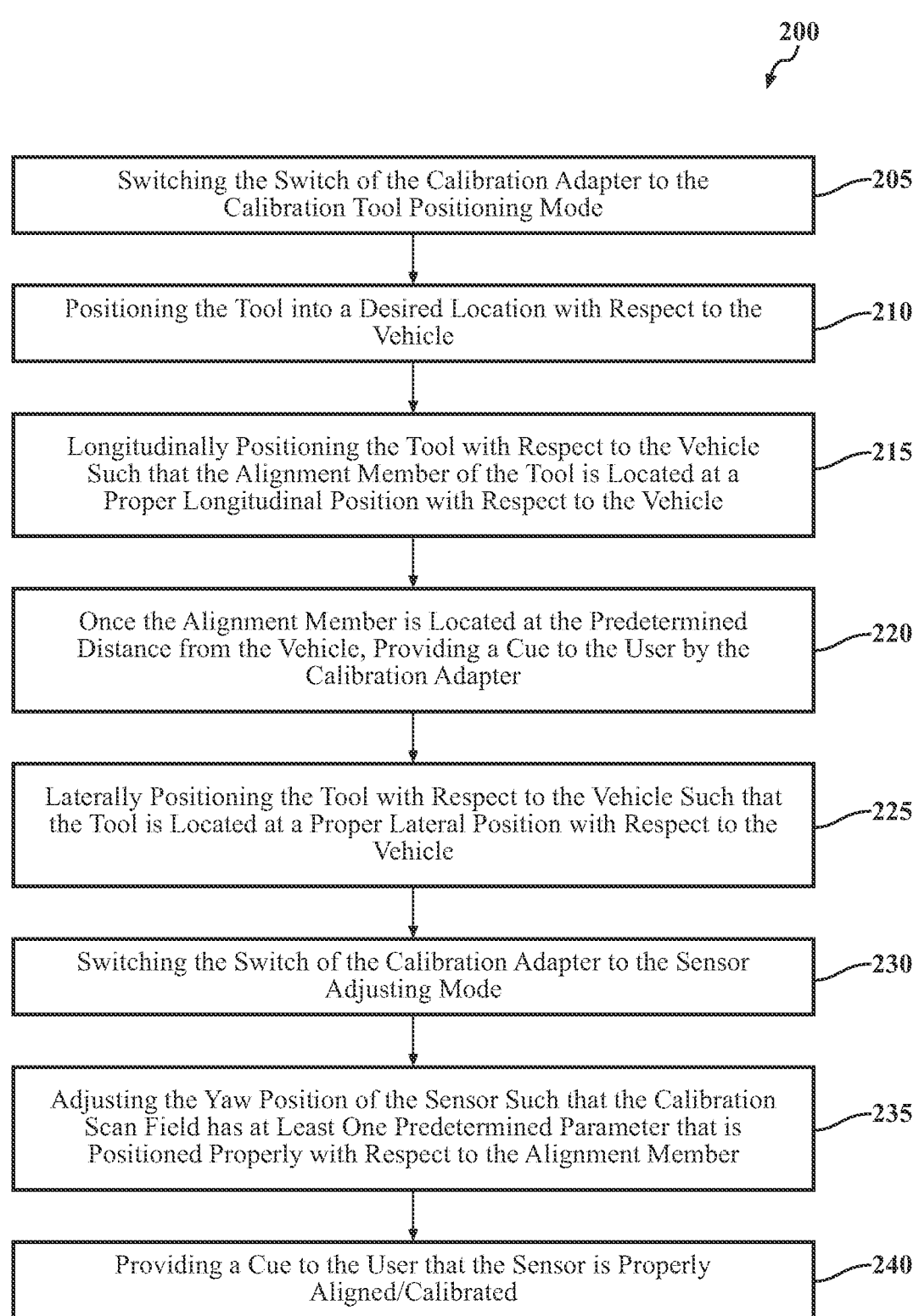

*200*

Switching the Switch of the Calibration Adapter to the Calibration Tool Positioning Mode ⟋—205

Positioning the Tool into a Desired Location with Respect to the Vehicle ⟋—210

Longitudinally Positioning the Tool with Respect to the Vehicle Such that the Alignment Member of the Tool is Located at a Proper Longitudinal Position with Respect to the Vehicle ⟋—215

Once the Alignment Member is Located at the Predetermined Distance from the Vehicle, Providing a Cue to the User by the Calibration Adapter ⟋—220

Laterally Positioning the Tool with Respect to the Vehicle Such that the Tool is Located at a Proper Lateral Position with Respect to the Vehicle ⟋—225

Switching the Switch of the Calibration Adapter to the Sensor Adjusting Mode ⟋—230

Adjusting the Yaw Position of the Sensor Such that the Calibration Scan Field has at Least One Predetermined Parameter that is Positioned Properly with Respect to the Alignment Member ⟋—235

Providing a Cue to the User that the Sensor is Properly Aligned/Calibrated ⟋—240

FIG. 18

SENSOR CALIBRATION TOOL

FIELD

The present disclosure relates to calibrating a sensor and to a tool that is used for calibrating a sensor.

BACKGROUND

Sensors that are used on objects, such as materials handling vehicles, may require calibration in order to perform adequately during operation.

SUMMARY

In accordance with a first aspect, a tool is provided for calibrating a sensor. The tool comprises an elongate rail structure including a first end and a second end, wherein a direction of elongation of the rail structure is defined in a lateral direction between the first and second ends, a first plate element extending from the rail structure at least partially in a first direction that is transverse to the lateral direction, and a second plate element extending from the rail structure at least partially in the first direction and spaced apart from the first plate element in the lateral direction. The tool further comprises an alignment member extending from the rail structure at least partially in the first direction, the alignment member located between the first and second plate elements.

The first plate element may be located at or near the first end of the rail structure and the second plate element is located at or near the second end of the rail structure. The first and second plate elements may be elongate in the lateral direction, wherein the first direction may be perpendicular to the lateral direction and may define an upward direction when the tool is positioned for use on a floor surface The rail structure may have a depth in a second direction that is transverse to the first direction and to the lateral direction, wherein the depth may be sufficient such that the tool is freestanding while positioned for use on a floor surface.

The first and second plate elements may each include a plurality of visible indicia, wherein the visible indicia may have a direction of elongation in the first direction. The plurality of visible indicia on the first plate element may be symmetrical to the plurality of visible indicia on the second plate element.

In accordance with a second aspect, a method is provided for calibrating a sensor located on an object using a calibration tool that is positioned on a floor surface that includes a first end and a second end, wherein a direction of elongation of the calibration tool is defined in a lateral direction between the first and second ends. The method comprises positioning the calibration tool into a desired location with respect to the object by longitudinally positioning the calibration tool such that an alignment member of the calibration tool is located a predetermined distance from the object in a longitudinal direction, wherein the longitudinal direction is perpendicular to the lateral direction and parallel to the floor surface. The method further comprises laterally positioning the calibration tool such that a first visible element generated by a first lateral positioning element provided on the object aligns with a first visible indicia on the calibration tool, and a second visible element generated by a second lateral positioning element provided on the object aligns with a second visible indicia on the calibration tool. The method further comprises adjusting a position of the sensor such that a calibration scan field thereof has at least one predetermined parameter that is positioned properly with respect to the alignment member.

The calibration tool may include first and second plate elements that are spaced apart from the alignment member in the lateral direction, the first plate element may comprise a first plurality of visible indicia including the first visible indicia, and the second plate element may comprise a second plurality of visible indicia including the second visible indicia.

Laterally positioning the calibration tool may comprise laterally positioning the calibration tool such that the first and second visible elements generated by the respective first and second lateral positioning elements align with corresponding ones of the first and second pluralities of visible indicia on the first and second plate elements.

Adjusting the position of the sensor such that the calibration scan field thereof has at least one predetermined parameter that is positioned properly with respect to the alignment member may comprise adjusting the sensor such that first and second lateral inner edges of the calibration scan field are located laterally outwardly from respective first and second lateral sides of the alignment member.

The method may further comprise providing a first cue to a user that the calibration tool is located at the predetermined distance from the object in the longitudinal direction, and providing a second cue to the user that the sensor is positioned such that the calibration scan field thereof has at least one predetermined parameter that is positioned properly with respect to the alignment member.

The first and second cues may be provided by a calibration adapter that includes a switch for switching between a calibration tool positioning mode, which is used during the longitudinal positioning of the calibration tool, and a sensor adjusting mode, which is used during the position adjustment of the sensor.

The object may comprise a materials handling vehicle.

According to a third aspect, a method is provided for calibrating a sensor located on an object using a calibration tool that includes a first end and a second end, wherein a direction of elongation of the calibration tool is defined in a lateral direction between the first and second ends. The sensor includes a normal operation scan field that is used during normal operation of the object, the normal operation scan field having predefined scan parameters that define an area scanned by the sensor. The method comprises adjusting a position of the calibration tool into a desired location with respect to the object, implementing, with the sensor, a calibration scan field that is different than the normal operation scan field, and adjusting a position of the sensor such that at least one parameter of the calibration scan field is positioned properly with respect to an alignment member of the calibration tool.

The calibration tool may include first and second plate elements that are spaced apart from the alignment member in the lateral direction, the first plate element may comprise a first plurality of visible indicia including the first visible indicia, and the second plate element may comprise a second plurality of visible indicia including the second visible indicia. Adjusting a position of the calibration tool into a desired location with respect to the object may comprise laterally positioning the calibration tool such that a first visible element generated by a first lateral positioning element provided on the object aligns with a first visible indicia on the calibration tool, and a second visible element generated by a second lateral positioning element provided on the object aligns with a second visible indicia on the calibration tool.

Adjusting a position of the calibration tool into a desired location with respect to the object may comprise longitudinally positioning the calibration tool such that the alignment member of the calibration tool is located a predetermined distance from the object in a longitudinal direction, wherein the longitudinal direction may be perpendicular to the lateral direction and parallel to a floor surface.

The method may further comprise providing a first cue to a user that the calibration tool is located at the predetermined distance from the object in the longitudinal direction, and providing a second cue to the user that the calibration scan field is positioned properly with respect to the alignment member of the calibration tool.

Adjusting a position of the sensor such that at least one parameter of the calibration scan field is positioned properly with respect to an alignment member of the calibration tool may comprise adjusting the sensor such that first and second lateral inner edges of the calibration scan field are located laterally outwardly from respective first and second lateral sides of the alignment member.

Adjusting the position of the sensor may comprise adjusting a yaw position of the sensor.

BRIEF DESCRIPTION OF THE DRAWINGS

FIG. 12 is a perspective view of a calibration adapter according to embodiments;

FIGS. 13-15 illustrate exemplary sensor scan fields;

FIG. 18 illustrates a method for calibrating a sensor located on an object using a sensor calibration tool in accordance with embodiments.

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. It should be understood that multiple combinations of the embodiments described and shown are contemplated and that a particular focus on one embodiment does not preclude its inclusion in a combination of other described embodiments. Numerous alternative embodiments could also be implemented, using either current technology or technology developed after the filing date of this patent, which would still fall within the scope of the claims. All publications and patents cited herein are incorporated herein by reference.

Figure 1:
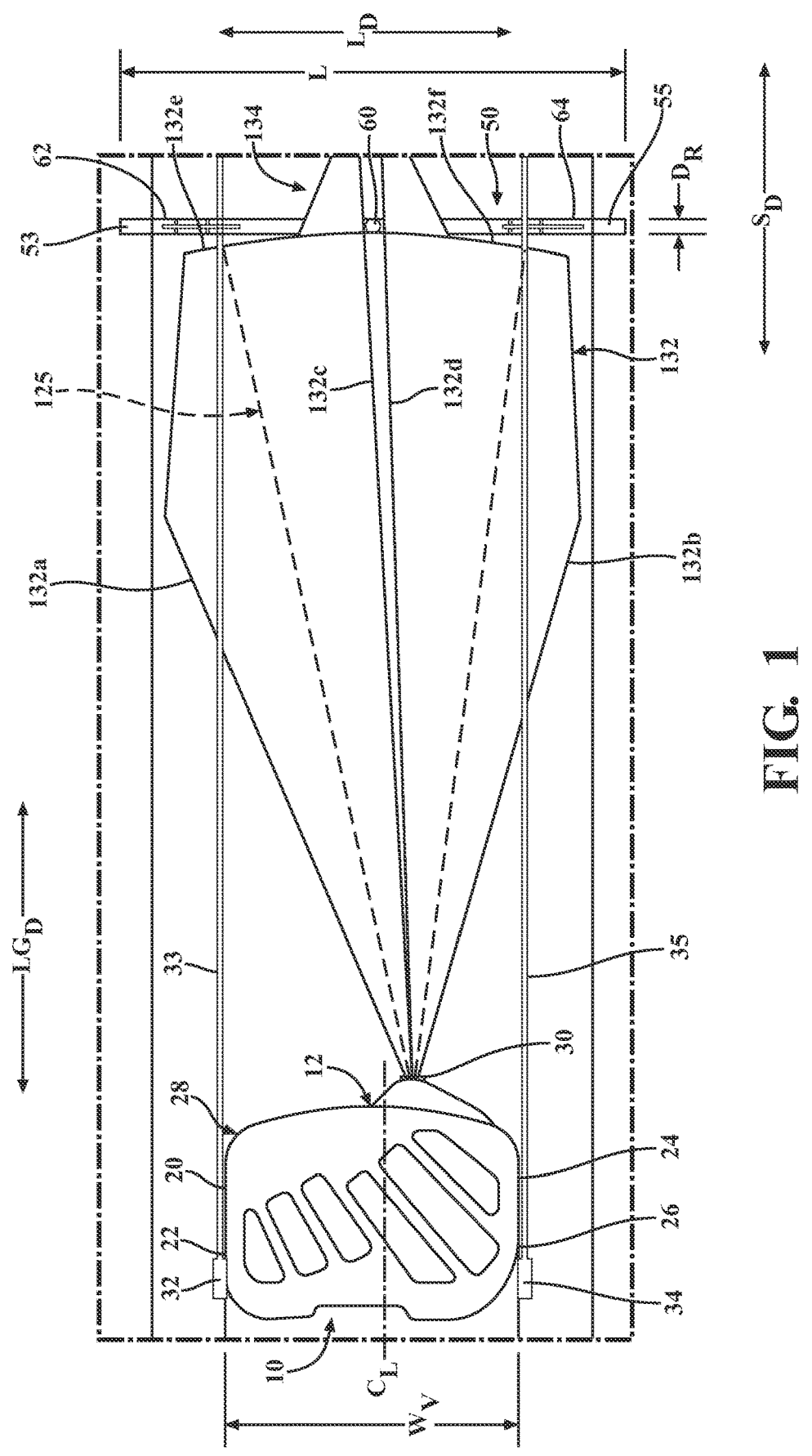
FIG. 1 illustrates an object and a sensor calibration tool according to embodiments.

Referring now to the drawings, an exemplary object 10 is illustrated in FIG. 1. The exemplary object 10 shown in FIG. 1 is a vehicle 10 and the following text describes the object 10 in terms of the exemplary vehicle 10, but the embodiments disclosed herein are not meant to be limited to the object 10 being a vehicle.

Figure 1A:
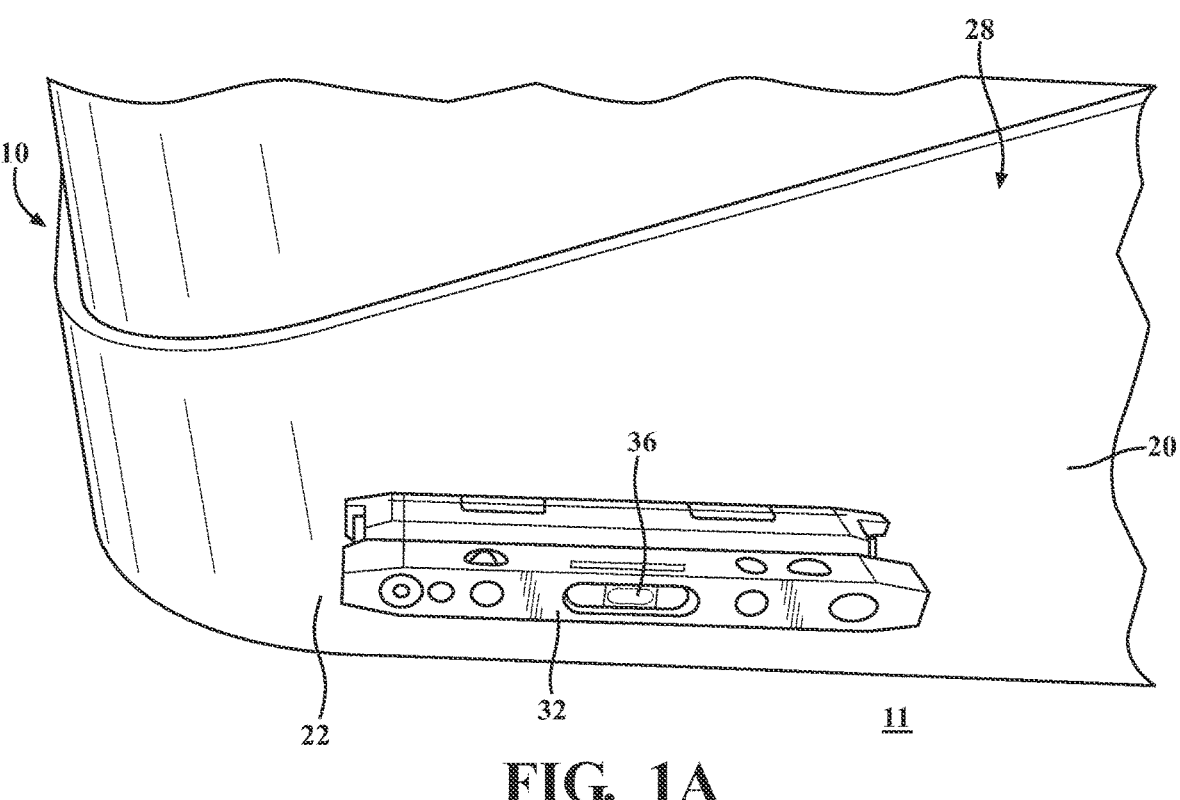
FIG. 1A is a partial perspective view of a lateral positioning element provided on the object of FIG. 1.

The vehicle 10 may be any type of vehicle, such as an industrial truck that includes a power unit 12, a load handling assembly 14 (see FIGS. 14 and 15), and an operator compartment 16 (see FIG. 15). The power unit 12, the load handling assembly, and the mast assembly each include conventional components, as will be apparent to those having original skill in the art, which components will not be described in detail herein. The vehicle 10 includes a first side 20 having a first portion 22 adjacent to a floor surface 11, and a second side 24 having a second portion 26 adjacent to the floor surface 11. The first and second portions 22, 26 may be located on a bumper 28 that wraps around the front of the vehicle 10 at a lower portion thereof, see also FIG. 1A.

The vehicle 10 may also include one or more sensors that are provided to detect objects in and/or around the vehicle 10. For example, a sweeping laser sensor 30 may be provided at the front of the vehicle 10 to detect objects that are located in or around a path of travel of the vehicle 10 during normal operation of the vehicle 10. According to embodiments, the pitch, roll, and/or yaw position of the sensor 30 may need to be adjusted to calibrate the sensor 30, wherein adjustment of the yaw position of the sensor 30 will be discussed in detail herein.

First and second lateral positioning elements 32, 34 (hereinafter "positioning elements 32, 34") may be provided on the vehicle 10. The positioning elements 32, 34 may be permanently affixed to the vehicle 10, such as integrally formed with the vehicle 10 or welded to the vehicle 10, for example, or may be removably affixed to the vehicle 10, such as by magnetic or adhesive attachment, for example. The positioning elements 32, 34 may comprise light sources, such as lasers, for generating respective first and second visible elements 33, 35. The positioning elements 32, 34 may also include level indicators 36 (see FIG. 1A) to ensure that the positioning elements 32, 34 are positioned level on the floor surface 11. The positioning elements 32, 34 and their function will be described in greater detail below.

Figure 2:
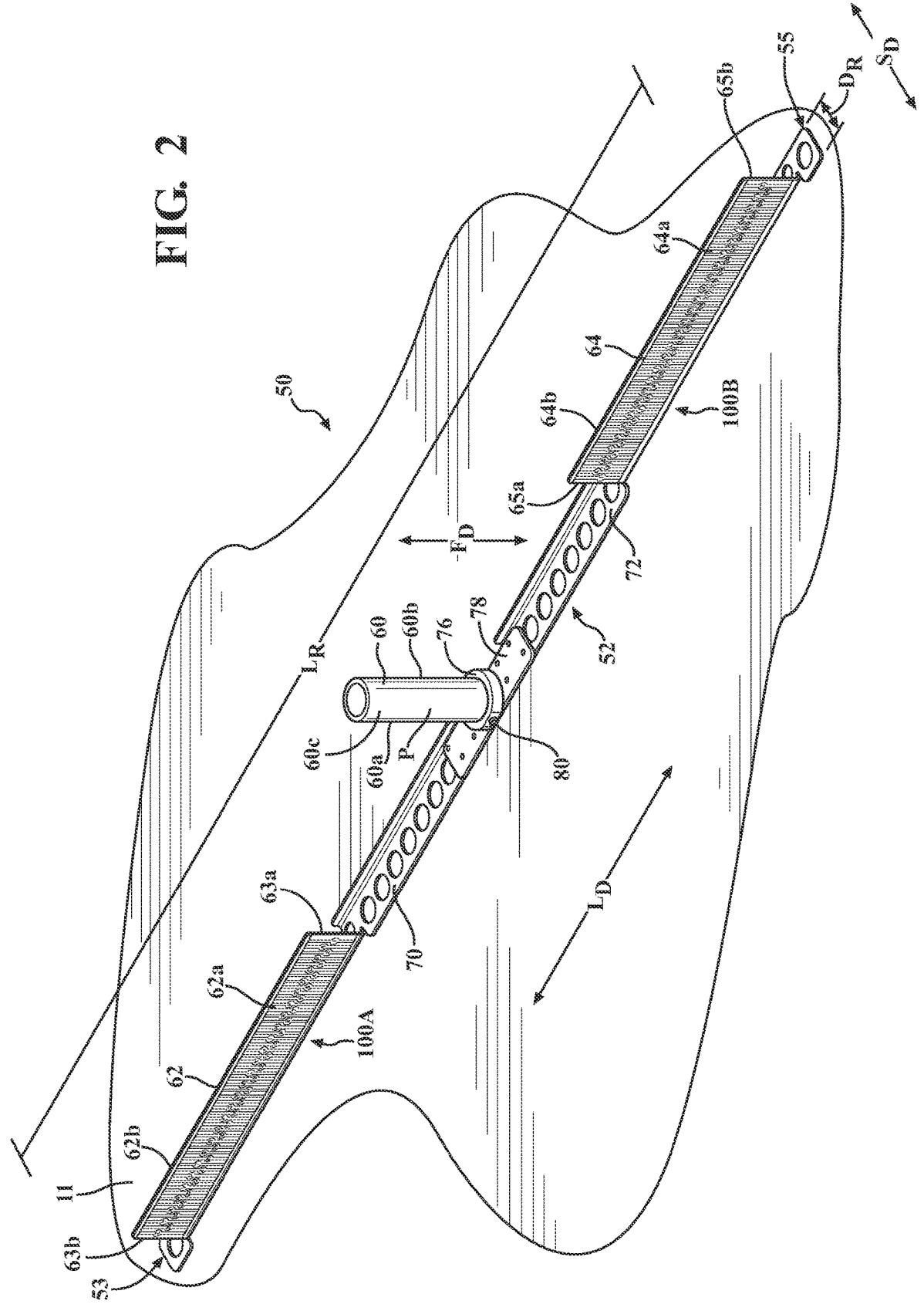
FIG. 2 is a perspective view of a sensor calibration tool according to embodiments.
Figures 3, 4:
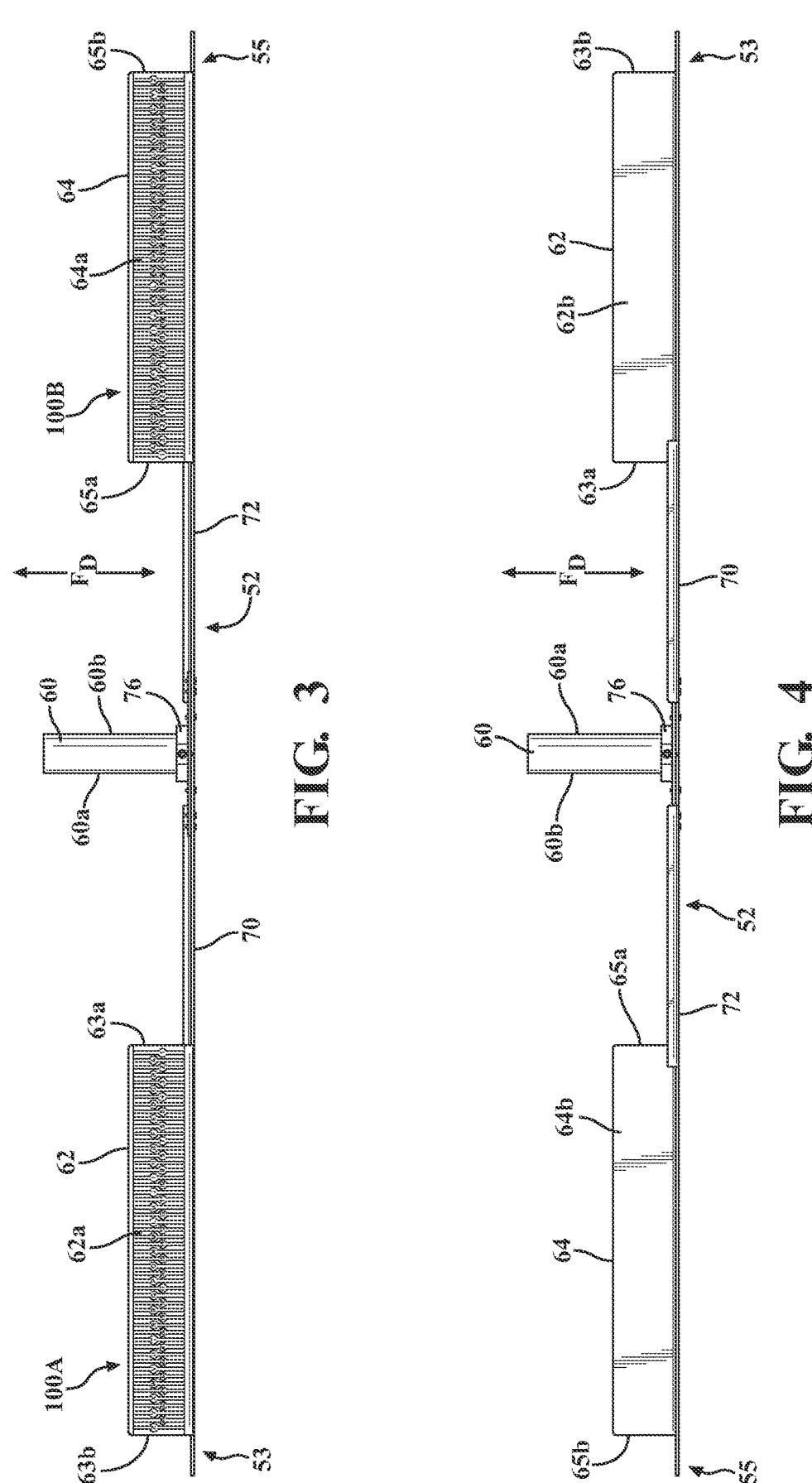
FIG. 3 is a front elevation view of the sensor calibration tool.
FIG. 4 is a rear elevation view of the sensor calibration tool.
Figures 5, 6:
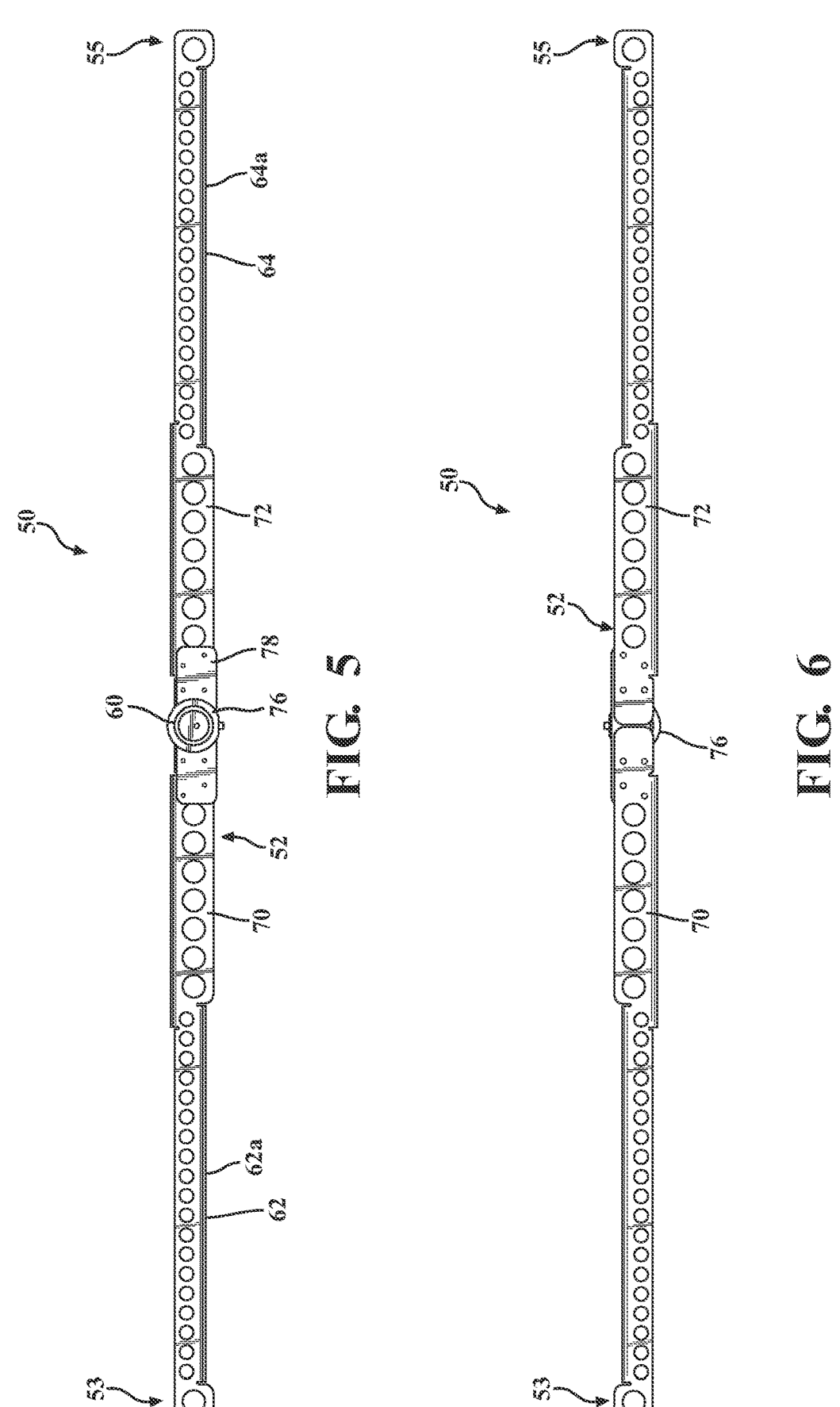
FIG. 5 is a top plan view of the sensor calibration tool.
FIG. 6 is a bottom plan view of the sensor calibration tool.
Figure 8:
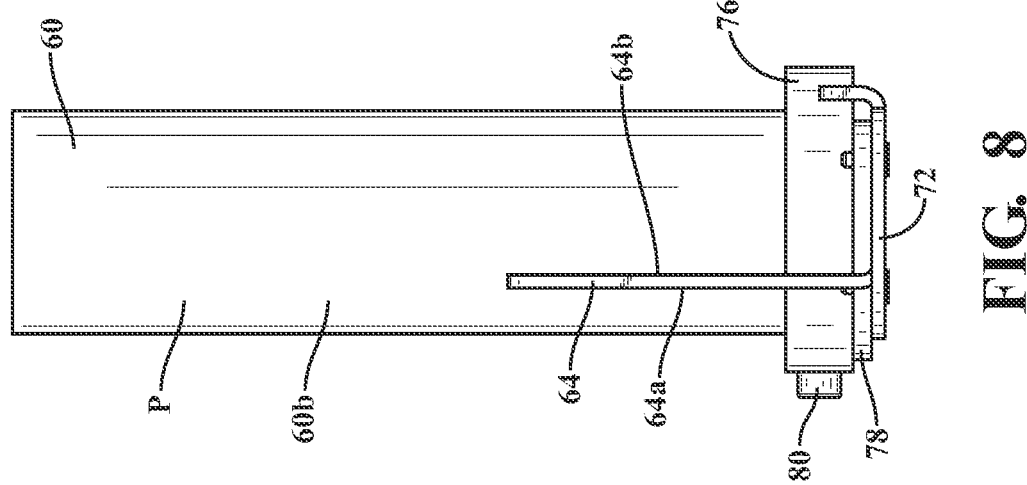
FIG. 8 is a second side elevation view of the sensor calibration tool.
Figure 7:
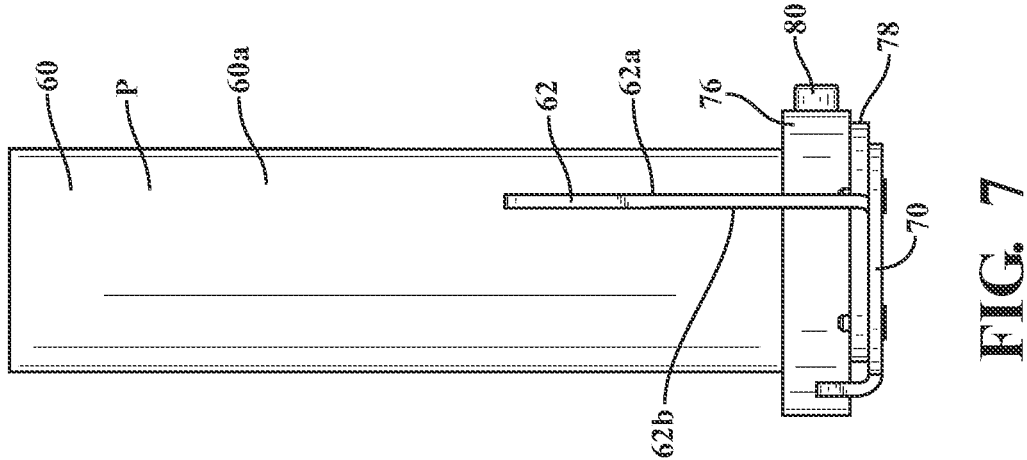
FIG. 7 is a first side elevation view of the sensor calibration tool.
Figure 9:
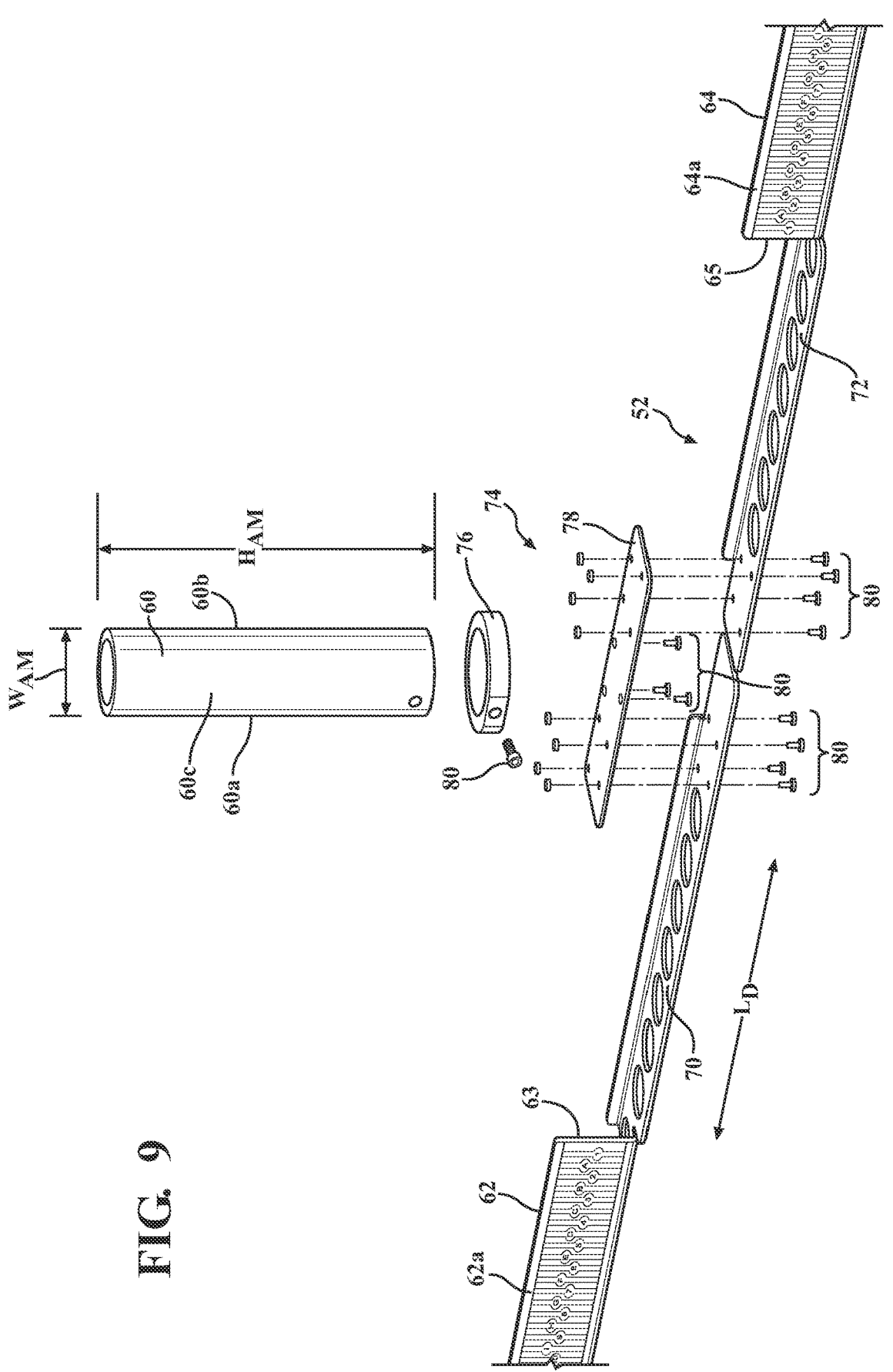
FIG. 9 is an exploded view of the sensor calibration tool.

With reference now to FIGS. 2-9, a sensor calibration tool 50 (hereinafter "tool 50") that is used for calibrating the sensor 30 is depicted. The tool 50 includes an elongate rail structure 52 having a first end 53 and a second end 55 spaced apart from the first end 53 in a lateral direction LD that defines a direction of elongation of the rail structure 52. The tool 50 further includes an alignment member 60 located between the first and second ends 53, 55. The alignment member 60 extends from the rail structure 52 in a first direction FD that is transverse to the lateral direction LD. As shown in FIG. 2, the first direction FD may be perpendicular to the lateral direction LD and may extend vertically upward from the rail structure 52 when the tool 50 is standing upright on the floor surface 11. The alignment member 60 includes a first lateral side 60a, a second lateral side 60b, a front side 60c and may have a curved front profile P that may be advantageous for calibrating the sensor 30, as will be described in detail below. As one example, the alignment member 60 may be a cylindrical member as shown in FIGS. 2-9. The alignment member 60 may have a height H$_{AM}$ that defines a direction of elongation of the alignment member 60, and a width W$_{AM}$ defined between the first and second lateral sides 60a, 60b, see FIG. 9.

The tool 50 further includes a first plate element 62 extending from the rail structure 52 at least partially in the first direction FD, and, according to the exemplary embodiment shown, wholly in the first direction FD such that the first plate element 62 is parallel to the alignment member 60. The first plate element 62 is positioned on the rail structure 52 at or near the first end 53 thereof, and may be located between the first lateral side 60a of the alignment member 60 and the first end 53 of the rail structure 52. A second plate element 64 extends from the rail structure 52 at least partially in the first direction FD, and, according to the exemplary embodiment shown, wholly in the first direction FD such that the second plate element 64 is parallel to the alignment member 60 and to the first plate element 62. The second plate element 64 is positioned on the rail structure 52 at or near the second end 55 thereof, and may be located between the second lateral side 60b of the alignment member 60 and the second end 55 of the rail structure 52.

With reference to FIGS. 1 and 2, the rail structure 52 has a depth D$_R$ in a second direction S$_D$, also referred to herein as the longitudinal direction, which is transverse to the first direction FD and to the lateral direction L$_D$. The depth D$_R$ of the rail structure 52 is preferably sufficient such that the tool 50 is freestanding on the floor surface 11, i.e., the tool 50 does not need to be externally supported, while in use. According to one exemplary embodiment, the depth D$_R$ of the rail structure 52 may be at least one inch to allow it to be freestanding while in use. The rail structure 52 has a length L$_R$ in the lateral direction L$_D$ that is preferably greater than a width W$_V$ of the vehicle 10, see FIG. 1. The greater length L$_R$ of the rail structure 52 than the width W$_V$ of the vehicle 10 allows for efficient positioning of the tool 50 for a sensor calibration process, which will be described in detail herein. Since the tool 50 is intended for use with many types of materials handling vehicles that may have varying widths, the length L$_R$ of the rail structure 52 is preferably greater than the width of any type of materials handling vehicle that would potentially utilize the tool 50 for a sensor calibration process as described herein.

According to one embodiment, the rail structure 52 may be formed as a single piece that extends from the first end 53 to the second end 55. According to other embodiments, the rail structure 52 may be formed from two or more pieces. For example, as shown most clearly in FIG. 9, the rail structure 52 may comprise a first structure 70 and a second structure 72 that are removably attached to one another via a connection assembly 74. The exemplary connection assembly 74 according to the embodiment shown comprises a retainer bracket 76, a plate bracket 78, and a plurality of coupling elements 80 for securing the alignment member 60 to the retainer bracket 76 and for coupling the first and second structures 70, 72 together via the plate bracket 78. It is understood that other types of connection assemblies could be used to couple the rail structure components together as desired. It is also understood that the rail structure 52 could be integrally formed with the alignment member 60 as a single unit.

The first plate element 62 may be located at least partially between the first end 53 of the rail structure 52 and the first lateral side 60a of the alignment member 60, and the second plate element 64 may be located at least partially between the second end 55 of the rail structure 52 and the second lateral side 60b of the alignment member 60. According to the embodiment shown, the first plate element 62 is entirely located between the first end 53 of the rail structure 52 and the first lateral side 60a of the alignment member 60, although the first plate element 62 may extend laterally outwardly past the first end 53 of the rail structure 52 according to embodiments. Similarly, the second plate element 64 is located entirely between the second end 55 of the rail structure 52 and the second lateral side 60b of the alignment member 60, although the second plate element 64 may extend laterally outwardly past the second end 55 of the rail structure 52 according to embodiments. Moreover, while the first and second plate elements 62, 64 may be located equidistant from the alignment member 60 as in the embodiment shown, the distances between the first plate element 62 and the alignment member 60 and between the second plate element 64 and the alignment member 60 may be different.

Figures 10A, 10B:
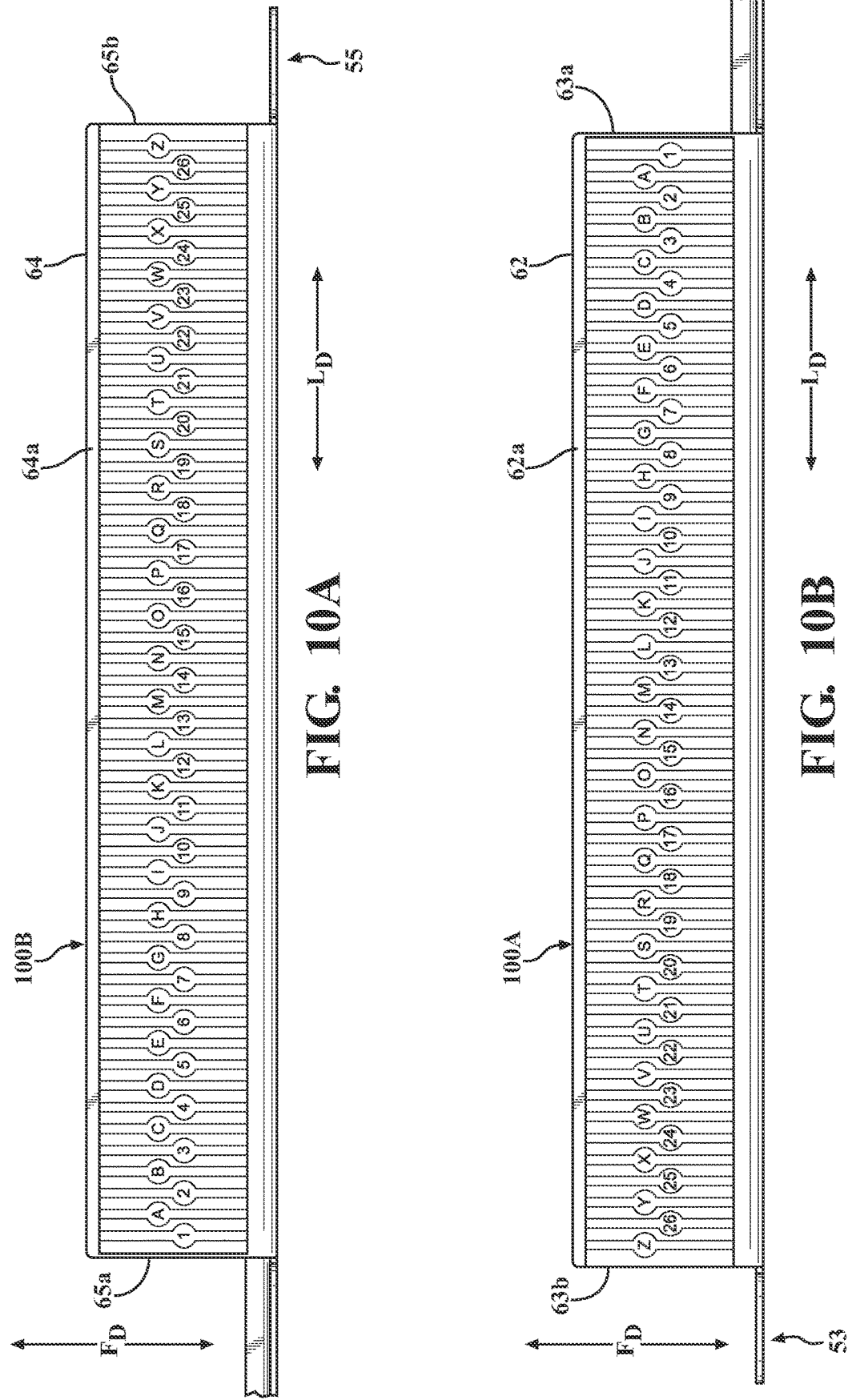
FIGS. 10A and 10B are front elevation views of first and second plate elements of the sensor calibration tool according to embodiments.

The first and second plate elements 62, 64 may be mirror images of one another to aid in aligning the tool 50 for the sensor calibration process described below. The first and second plate elements 62, 64 are elongate in the lateral direction L$_D$ and may have any suitable shape, such as a rectangular shape as shown most clearly in FIGS. 10A and 10B. The first plate element 62 includes a front surface 62a, a rear surface 62b, a laterally inner edge 63a, and a laterally outer edge 63b, and the second plate element 64 includes a front surface 64a, a rear surface 64b, a laterally inner edge 65a, and a laterally outer edge 65b. Each plate element 62, 64 includes a respective plurality of visible indicia 100A, 100B on the front surface 62a, 64a thereof, the first and second pluralities of indicia 100A, 100B having a direction of elongation in the first direction FD and preferably being symmetrical to one another. The first and second pluralities of indicia 100A, 100B as shown in the exemplary embodiment depicted in FIG. 11 comprise columns C1-N that extend in the first direction FD. The columns C1-N may be of varying colors, patterns, etc. With the first and second plate elements 62, 64 being mirror images of one another and the first and second pluralities of indicia 100A, 100B being symmetrical, the columns C1-N on the second plate element 64 correspond to the columns C1-N on the first plate element 62. Additionally, the lateral distance between the lateral inner edge 63a and the first column C1 of the first plate element 62 may be the same as the lateral distance between the first column C1 of the second plate element 64 and the lateral inner edge 65a thereof. Moreover, the number of columns of indicia 100A, 100B on the first and second plate elements 62, 64 may be the same.

Figures 12, 13:
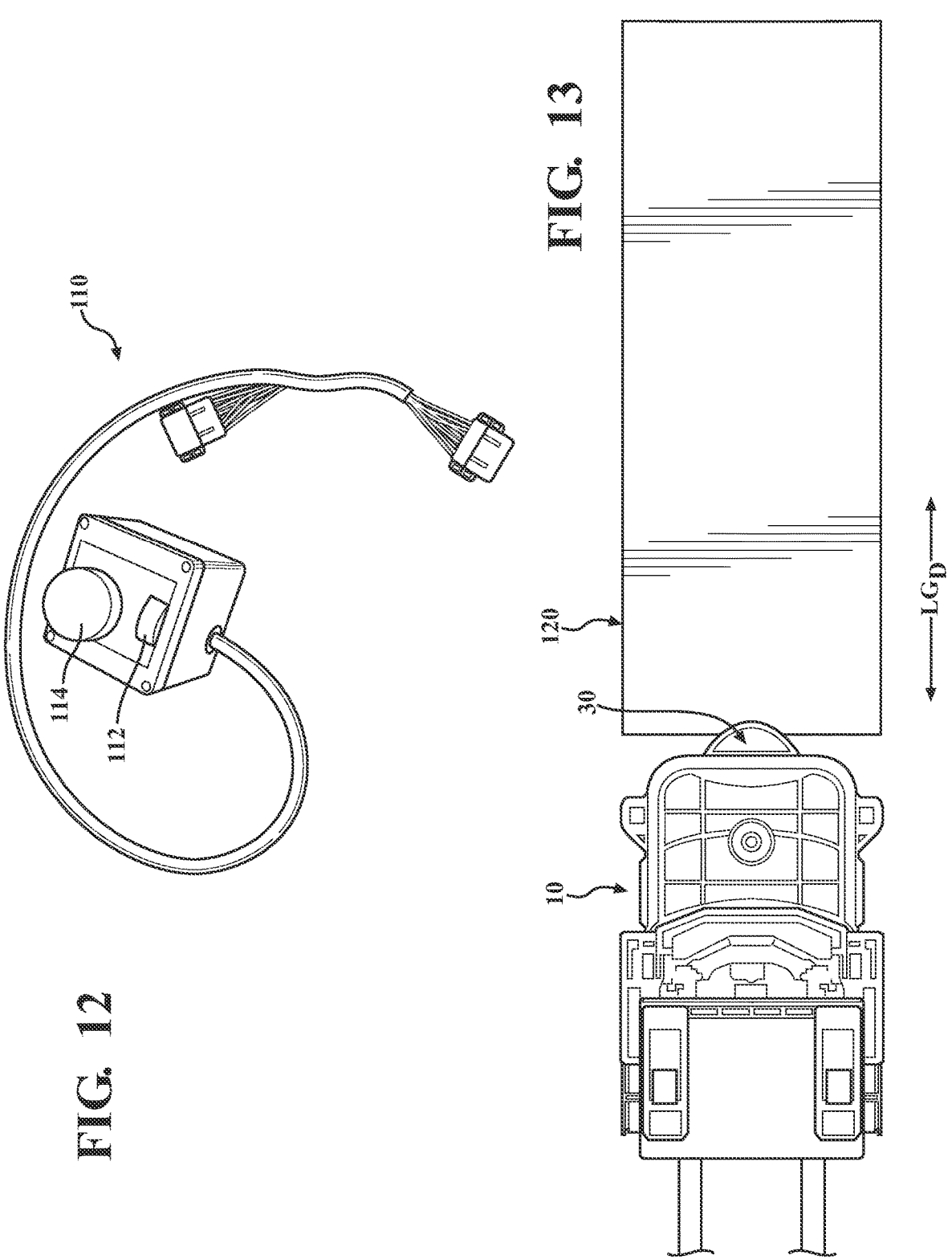

Referring now to FIG. 12, an exemplary calibration adapter 110 according to embodiments may be provided for use during the sensor calibration process to be described below. The calibration adapter 110 may be temporarily provided on the vehicle 10, e.g., removably coupled to the vehicle 10 during the sensor calibration process and then removed from the vehicle 10 once the process is complete. The calibration adapter 110 could also be provided as an integral part of the vehicle 10 according to embodiments. The calibration adapter 110 is communicably coupled to the sensor 30, as will be discussed in greater detail herein.

The calibration adapter 110 shown in FIG. 12 includes a switch 112 for switching the calibration adapter 110 between different operating modes, such as a calibration tool positioning mode and a sensor adjusting mode, which modes will be discussed in detail herein. The calibration adapter 110 also includes an indicator, for example a light indicator 114 that is used to provide one or more cues to a user during the sensor calibration process, as will be described herein.

Referring to FIGS. 13-15, the one or more sensors on the vehicle 10, including the sweeping laser sensor 30, may be used to scan a normal operation scan field during normal operation of the vehicle 10. Normal operation of the vehicle 10, as used herein, may be defined as general movement of the vehicle 10, such as, for example, during conveyance of goods and/or materials, where movement of the vehicle 10 may be controlled either manually, e.g., by an operator using physical controls on the vehicle 10, or remotely, e.g., using a remote control device or by a warehouse management system.

The normal operation scan field may take the form of a variety of different configurations, examples of which are shown in FIGS. 13-15. In the first example shown in FIG. 13, a first normal operation scan field 120 is illustrated as having scan parameters that are located out in front of the vehicle 10 and define a rectangular shape. In the second example shown in FIG. 14, a second normal operation scan field 122 is illustrated as having scan parameters that are located out in front of the vehicle 10 and also to the first and second sides 20, 24 thereof, and define a scalloped shape with a plurality of laterally inwardly extending notches and at least a partially rounded front edge. In the third example shown in FIG. 15, a third normal operation scan field 124 is illustrated as having scan parameters that are located out in front of the vehicle 10 and also to the first and second sides 20, 24 thereof, and define a rectangular shape with a plurality of action zones located therewithin. Each of the exemplary normal operation scan fields 120, 122, 124 illustrated in FIGS. 13-15 may be used for obstacle detection, wherein one or more of a speed, steer angle, or other vehicle movement parameter may be adjusted based upon the detection of an object in the associated normal operation scan field 120, 122, 124.

Figure 16:
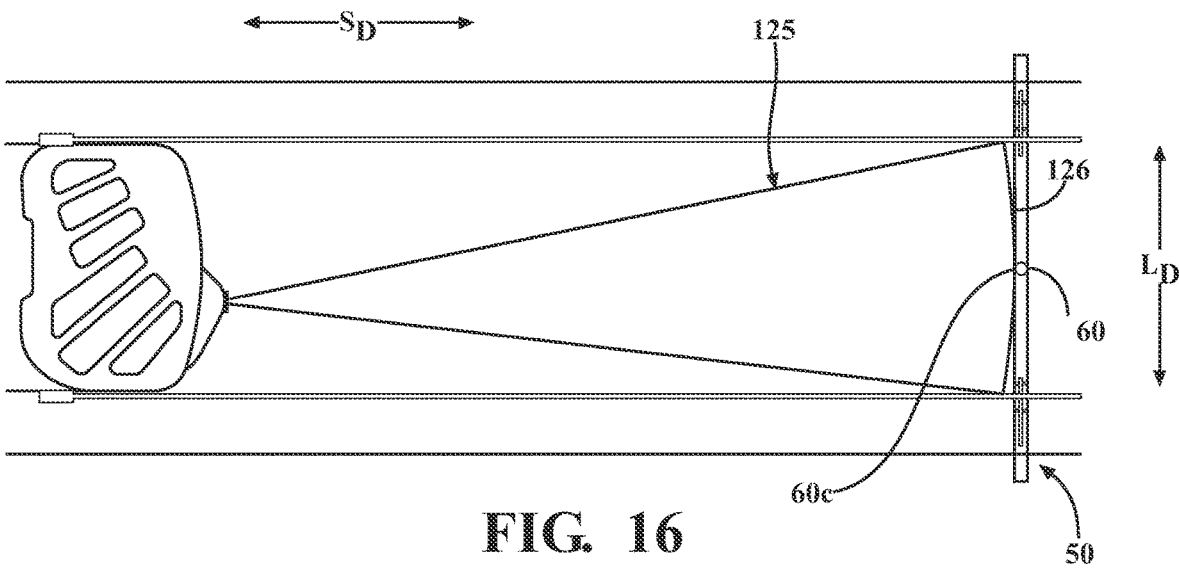
FIG. 16 illustrates a positioning scan field according to embodiments.
Figure 17:
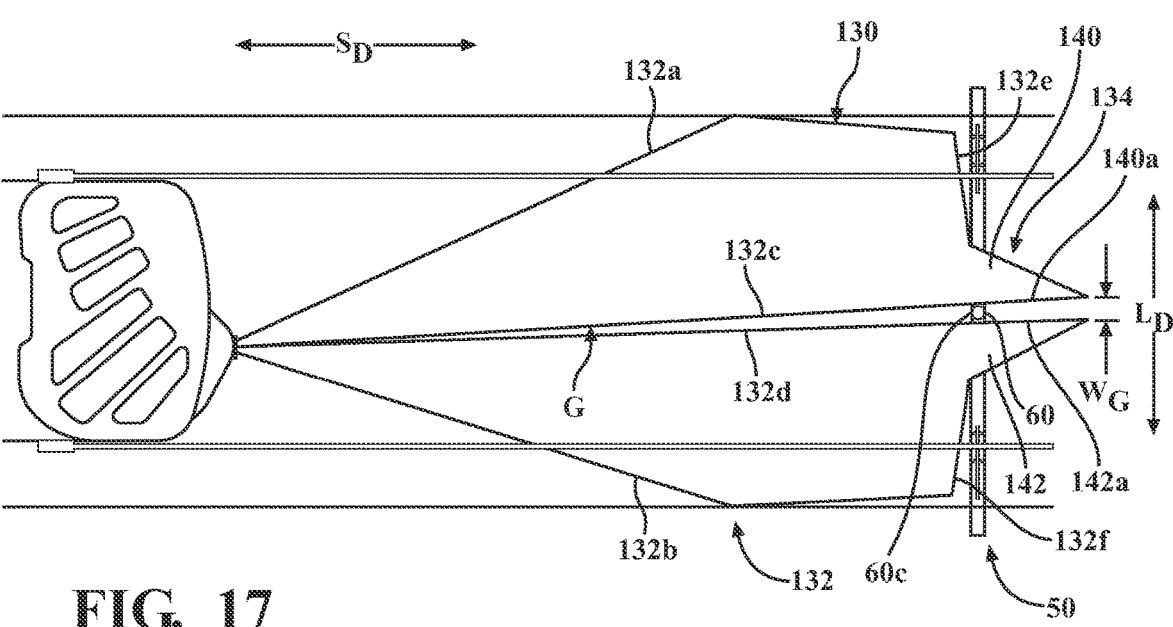
FIG. 17 illustrates a calibration scan field according to embodiments.

With reference to FIGS. 16 and 17, a positioning scan field 125 and a calibration scan field 130 of the sweeping laser sensor 30 are respectively shown, which are different from the normal operation scan fields 120, 122, 124 and are used specifically during the sensor calibration process described below, and not during normal operation of the vehicle 10. The positioning and calibration scan fields 125, 130 each have at least one scan parameter that is tailored specifically to be used with the tool 50 during the sensor calibration process. For example, the exemplary positioning scan field 125 shown in FIG. 16 includes a scan parameter that defines a distal edge 126 of the positioning scan field 125 that, when the tool 50 is in a proper longitudinal position with respect to the vehicle 10 as described below, extends just up to the front side 60c of the alignment member 60 of the tool 50 in the second direction $S_D$ as the tool 50 is being positioned during the sensor calibration process. The exemplary calibration scan field 130 shown in FIG. 17 includes a first section 132 that is dimensioned to extend up to the front side 60c of the alignment member 60 of the tool 50 in the second direction $S_D$ during the sensor calibration process, and a second section 134 that is dimensioned to extend beyond the alignment member 60 of the tool 50 in the second direction $S_D$ during the sensor calibration process.

As shown in FIG. 17, the first section 132 of the calibration scan field 130 may include a scan parameter that defines a first outer lateral edge 132a of the calibration scan field 130 and a scan parameter that defines a second outer lateral edge 132b of the calibration scan field 130 spaced from the first outer lateral edge 132a in the lateral direction $L_D$. The first and second outer lateral edges 132a, 132b may be symmetrical to each other as they extend longitudinally away from the vehicle 10 in the second direction $S_D$ and may taper outwardly in the lateral direction $L_D$. The first section 132 of the calibration scan field 130 may also include a scan parameter that defines a first inner lateral edge 132c of the calibration scan field 130 and a scan parameter that defines a second inner lateral edge 132d of the calibration scan field 130 spaced from the first inner lateral edge 132c in the lateral direction $L_D$ to define a gap G therebetween. The first and second inner lateral edges 132c, 132d may be symmetrical to one another as they extend longitudinally away from the vehicle 10 in the second direction $S_D$ and may taper outwardly in the lateral direction $L_D$.

A scan parameter that defines a first end edge 132e of the first section 132 extends from the first outer lateral edge 132a to the first inner lateral edge 132c and may have a curved profile, and a scan parameter that defines a second end edge 132f of the first section 132 extends from the second outer lateral edge 132b to the second inner lateral edge 132d and may have a curved profile.

The second section 134 of the calibration scan field 130 may comprise first and second extension elements 140, 142 that respectively extend from the first and second end edges 132e, 132f of the first section 132 in the second direction $S_D$ away from the vehicle 10. Scan parameters that define lateral inner edges 140a, 142a of the first and second extension elements 140, 142 align with the respective first and second inner lateral edges 132c, 132d of the first section 132 to define continuous extensions of the gap G. During the sensor calibration process as described below, the first and second extension elements 140, 142 extend past the alignment member 60 in the second direction $S_D$ and are located on opposed lateral sides of the alignment member 60 as the alignment member 60 is positioned within the gap G.

The gap G has a width $W_G$ that increases as the distance from the vehicle 10 increases due to the outward taper of the first and second inner lateral edges 132c, 132d of the first section 132 and the lateral inner edges 140a, 142a of the first and second extension elements 140, 142 in the lateral direction $L_D$. When the tool 50 is at a proper distance from the vehicle 10 in the second direction (hereinafter referred to as the "proper longitudinal position"), the gap G is slightly greater than the width $W_{AM}$ of the alignment member 60. According to embodiments, while the tool 50 is in the proper longitudinal position, the width $W_G$ of the gap G may only be about 0.01-1.0 inches greater than the width $W_{AM}$ of the alignment member 60, and preferably may be about 0.1-0.5 inches greater than the width $W_{AM}$ of the alignment member 60.

With reference now to FIG. 18, an exemplary sensor calibration process/method 200 for calibrating a sensor 30 using a tool 50 in accordance with embodiments will now be described. The method 200 will be described with reference to the object 10, i.e., the vehicle 10, and the tool 50 as discussed above. A calibration adapter 110 as described above may be coupled (e.g., temporarily coupled) to the vehicle 10 and in communication with the sensor 30 for use during the sensor calibration process. Unless mentioned otherwise, the order of the steps provided for the method 200 described below is exemplary, i.e., the steps of the disclosed method 200 do not need to be completed in the order provided unless the step indicates that it is to be completed before or after another step.

As an initial step, the vehicle 10 is positioned in a flat area on the floor surface 11. At step 205, the switch 112 of the calibration adapter 110 is switched to a calibration tool positioning mode, if not already in that mode. While the switch 112 of the calibration adapter 110 is in the calibration tool positioning mode, the sweeping laser sensor 30 implements the positioning scan field 125 as described herein.

Next, at step 210, the tool 50 is positioned into a desired location with respect to the vehicle 10 as follows. At step 215, the tool 50 is longitudinally positioned with respect to the vehicle 10 such that the alignment member 60 of the tool 50 is located at a proper longitudinal position with respect to the vehicle 10. The proper longitudinal position corresponds to the alignment member 60 being located at a predetermined distance from the vehicle 10 in the second direction $S_D$, wherein the second direction $S_D$ is perpendicular to the lateral direction $L_D$ and parallel to the floor surface 11. The predetermined distance of the alignment member 60 from the vehicle 10 corresponds to the distal edge 126 of the positioning scan field 125 shown in FIG. 16 extending just up to the front side 60c of the alignment member 60. This may be accomplished by the user longitudinally moving the tool 50 toward or away from the vehicle 10 until the alignment member 60 is located at the predetermined distance from the vehicle 10 in the second direction $S_D$.

Next, at step 220, once the alignment member 60 is located at the predetermined distance from the vehicle 10 in the second direction $S_D$, a cue is provided to the user. The cue may be an audible and/or visual cue, such as a light illuminated by the light indicator 114 of the calibration adapter 110, although other types of audible and/or visual cues could be used. The sensor 30 may communicate with the calibration adapter 110 to alert the calibration adapter 110 to provide the cue.

Figure 11:
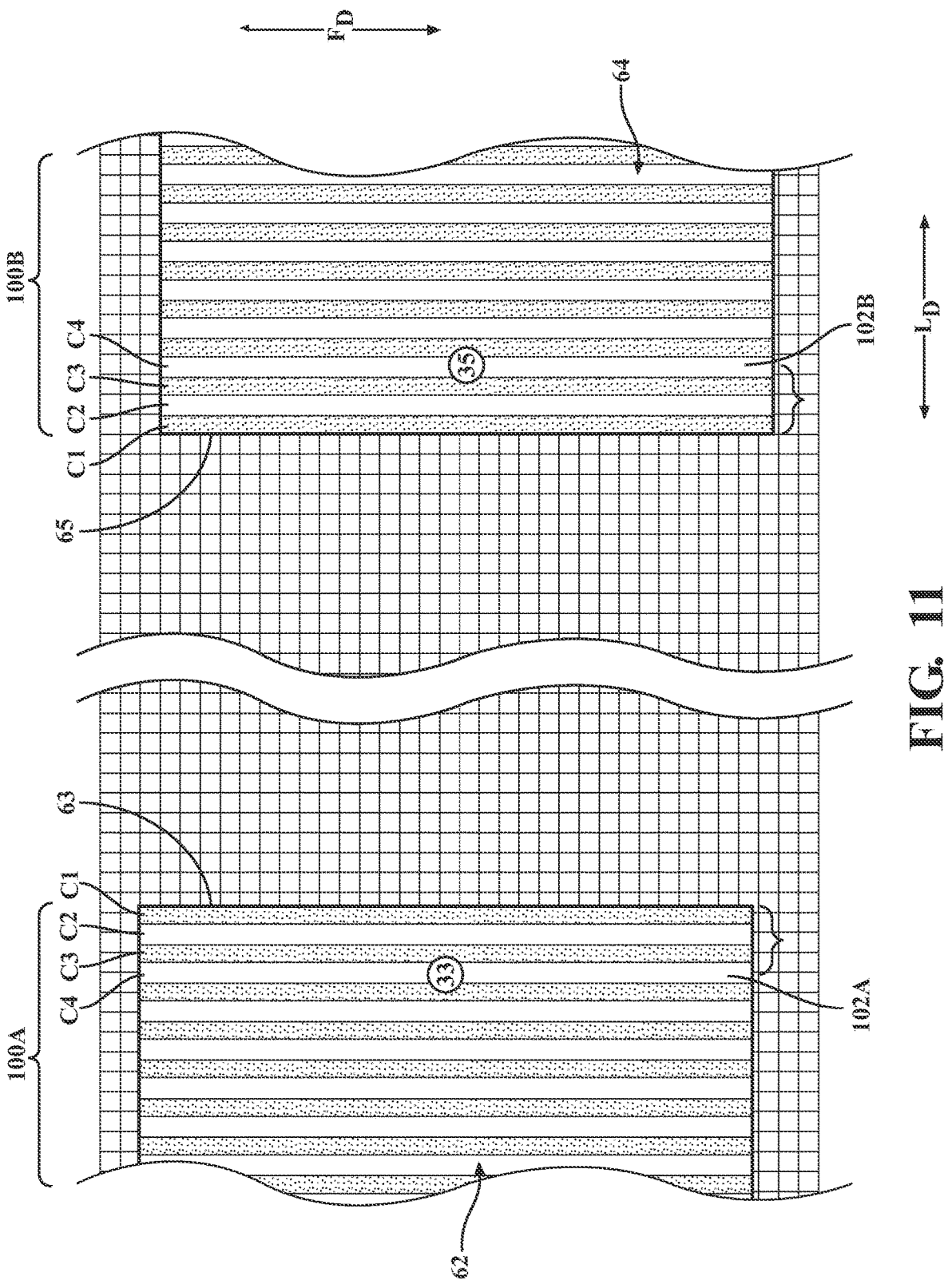
FIG. 11 is an enlarged partial view of a plurality of indicia on first and second plate elements of a sensor calibration tool according to embodiments.

At step 225, the tool 50 is laterally positioned with respect to the vehicle 10 such that the tool 50 is located at a proper lateral position with respect to the vehicle 10. The proper lateral position of the tool 50 with respect to the vehicle 10 may be achieved by laterally moving the tool 50 such that first and second visible elements 33, 35 generated by respective first and second lateral positioning elements 32, 34 provided on the vehicle 10 (e.g., temporarily coupled to the vehicle 10) align with corresponding ones of the first and second visible indicia 100A, 100B on the first and second plate elements 62, 64 of the tool 50. In the exemplary embodiment of the tool 50 described herein, this is illustrated in FIG. 11, where the first and second visible elements 33, 35 generated by respective first and second lateral positioning elements 32, 34 are located in the columns C4 provided on the first and second plate elements 62, 64 of the tool 50, which provides a visual cue to the user that the tool 50 is located at a proper lateral position with respect to the vehicle 10. If the sensor 30 is provided on a center line CL of the vehicle, laterally positioning the tool 50 may include laterally aligning the alignment member 60 with the center line CL of the vehicle 10.

If the tool 50 is positioned in the proper longitudinal position before being positioned in the proper lateral position, the proper longitudinal position is maintained during the lateral positioning of the tool 50, and if the tool 50 is positioned in the proper lateral position before being positioned in the proper longitudinal position, the proper lateral position is maintained during the longitudinal positioning of the tool 50.

Once the tool 50 is located at the desired location with respect to the vehicle, i.e., once the tool 50 is at the proper longitudinal and lateral positions with respect to the vehicle 10, the process/method 200 proceeds to step 230, wherein the switch 112 of the calibration adapter 110 is switched to the sensor adjusting mode. While the switch 112 of the calibration adapter 110 is in the sensor adjusting mode, the sweeping laser sensor 30 implements the calibration scan field 130 as described herein.

At step 235, the yaw position of the sensor 30 is adjusted such that the calibration scan field 130 thereof has at least one predetermined parameter that is positioned properly with respect to the alignment member 60. According to the exemplary embodiments described herein, the sensor 30 may be adjusted such that the lateral inner edges 140a, 142a of the first and second extension elements 140, 142 of the calibration scan field 130 are located laterally outwardly from the respective first and second lateral sides 60a, 60b of the alignment member 60, i.e., such that the alignment member 60 is entirely located within the gap G defined between the lateral inner edges 140a, 142a of the first and second extension elements 140, 142. Once the alignment member 60 is entirely located within the gap G, a cue is provided to the user at step 240 that the sensor 30 is properly aligned/calibrated. The cue provided at step 240 may be an audible and/or visual cue, such as a light illuminated by the light indicator 114 on the calibration adapter 110, although other types of audible and/or visual cues could be used. The cue provided at step 240 may or may not be distinguishable from the cue provided at step 220. The sensor 30 may communicate with the calibration adapter 110 to alert the calibration adapter 110 to provide the cue. Once the sensor calibration process is complete, the calibration adapter 110 may be removed from the vehicle 10.

Embodiments disclosed herein provide a sensor calibration tool that can be used to calibrate one or more parameters of a sensor provided on a materials handling vehicle, including the yaw position of the sensor. The tool is generic enough for use across multiple models of contemplated vehicles without regard to the size/shape of the vehicle, the mounting location, or the orientation of the sensor. In other words, the positioning of the sensor on the vehicle is not as important as in previous applications given that the tool will allow a user to precisely align the sensor to the desired field of view in the environment around the vehicle.

The tool disclosed herein permits the precise alignment of a sensor to a desired field of view in the environment around specific vehicle structure (e.g., centerline, operator compartment, angled to the running lines of the vehicle, a distance above the vehicle, etc.). Calibration field controls of the tolerance of the alignment can be modified based on the requirement of the application (e.g. a stock picker truck could have a +−0.5 degree tolerance and a rider counterbalance truck could have a +−1.0 degree tolerance, and the same process and tool may be used for both types of vehicles without the need to modify the tool). The feedback to the user provided by the cues disclosed herein is clear and concise, e.g., via the visible cues that indicate appropriate positioning of the tool and proper alignment/calibration of the sensor to the desired field of view. The same process may also be used to quickly check alignment during periodic maintenance.

Furthermore, embodiments disclosed herein provide one or more specialized scan fields of the sensor, which are different than the normal operation scan field(s) of the sensor and are used specifically during a sensor calibration process to calibrate the sensor.

The various features, aspects, and embodiments described herein can be used in any combination(s) with one another, or on their own.

Having thus described embodiments in detail, it will be apparent that modifications and variations are possible without departing from the scope of the appended claims.

What is claimed is:

1. A tool for calibrating a sensor comprising:
an elongate rail structure including a first end and a second end, wherein a direction of elongation of the rail structure is defined in a lateral direction between the first and second ends;
a first plate element extending from the rail structure at least partially in a first direction that is transverse to the lateral direction;
a second plate element extending from the rail structure at least partially in the first direction and spaced apart from the first plate element in the lateral direction; and
an alignment member extending from the rail structure at least partially in the first direction, the alignment member located between the first and second plate elements.

2. The tool of claim 1, wherein the first plate element is located at or near the first end of the rail structure and the second plate element is located at or near the second end of the rail structure.

3. The tool of claim 1, wherein the first and second plate elements are elongate in the lateral direction, and wherein the first direction is perpendicular to the lateral direction and defines an upward direction when the tool is positioned for use on a floor surface.

4. The tool of claim 1, wherein the rail structure has a depth in a second direction that is transverse to the first direction and to the lateral direction, wherein the depth is sufficient such that the tool is freestanding while positioned for use on a floor surface.

5. The tool of claim 1, wherein the first and second plate elements each include a plurality of visible indicia, wherein the visible indicia have a direction of elongation in the first direction.

6. The tool of claim 5, wherein the plurality of visible indicia on the first plate element are symmetrical to the plurality of visible indicia on the second plate element.

7. A method for calibrating a sensor located on an object using a calibration tool that is positioned on a floor surface and comprises a first end and a second end, wherein a direction of elongation of the calibration tool is defined in a lateral direction between the first and second ends, the method comprising:
positioning the calibration tool into a desired location with respect to the object by:
longitudinally positioning the calibration tool such that an alignment member of the calibration tool is located a predetermined distance from the object in a longitudinal direction, wherein the longitudinal direction is perpendicular to the lateral direction and parallel to the floor surface; and
laterally positioning the calibration tool such that:
a first visible element generated by a first lateral positioning element provided on the object aligns with a first visible indicia on the calibration tool; and a second visible element generated by a second lateral positioning element provided on the object aligns with a second visible indicia on the calibration tool; and
adjusting a position of the sensor such that a calibration scan field thereof has at least one predetermined parameter that is positioned properly with respect to the alignment member.

8. The method of claim 7, wherein the calibration tool includes first and second plate elements that are spaced apart from the alignment member in the lateral direction, the first plate element comprising a first plurality of visible indicia including the first visible indicia, and the second plate element comprising a second plurality of visible indicia including the second visible indicia.

9. The method of claim 8, wherein laterally positioning the calibration tool comprises laterally positioning the calibration tool such that the first and second visible elements generated by the respective first and second lateral positioning elements align with corresponding ones of the first and second pluralities of visible indicia on the first and second plate elements.

10. The method of claim 7, wherein adjusting the position of the sensor such that the calibration scan field thereof has at least one predetermined parameter that is positioned properly with respect to the alignment member comprises adjusting the sensor such that first and second lateral inner edges of the calibration scan field are located laterally outwardly from respective first and second lateral sides of the alignment member.

11. The method of claim 7, further comprising:
providing a first cue to a user that the calibration tool is located at the predetermined distance from the object in the longitudinal direction; and
providing a second cue to the user that the sensor is positioned such that the calibration scan field thereof has at least one predetermined parameter that is positioned properly with respect to the alignment member.

12. The method of claim 11, wherein the first and second cues are provided by a calibration adapter that includes a switch for switching between a calibration tool positioning mode, which is used during the longitudinal positioning of the calibration tool, and a sensor adjusting mode, which is used during the position adjustment of the sensor.

13. The method of claim 7, wherein the object comprises a materials handling vehicle.

14. A method for calibrating a sensor located on an object using a calibration tool that comprises a first end and a second end, wherein a direction of elongation of the calibration tool is defined in a lateral direction between the first and second ends, and wherein the sensor includes a normal operation scan field that is used during normal operation of the object, the normal operation scan field having predefined scan parameters that define an area scanned by the sensor, the method comprising:
adjusting a position of the calibration tool into a desired location with respect to the object;
implementing, with the sensor, a calibration scan field that is different than the normal operation scan field; and
adjusting a position of the sensor such that at least one parameter of the calibration scan field is positioned properly with respect to an alignment member of the calibration tool.

15. The method of claim 14, wherein the calibration tool includes first and second plate elements that are spaced apart from the alignment member in the lateral direction, the first plate element comprising a first plurality of visible indicia including the first visible indicia, and the second plate element comprising a second plurality of visible indicia including the second visible indicia.

16. The method of claim 14, wherein adjusting a position of the calibration tool into a desired location with respect to the object comprises laterally positioning the calibration tool such that:

a first visible element generated by a first lateral positioning element provided on the object aligns with a first visible indicia on the calibration tool; and a second visible element generated by a second lateral positioning element provided on the object aligns with a second visible indicia on the calibration tool.

17. The method of claim 14, wherein adjusting a position of the calibration tool into a desired location with respect to the object comprises longitudinally positioning the calibration tool such that the alignment member of the calibration tool is located a predetermined distance from the object in a longitudinal direction, wherein the longitudinal direction is perpendicular to the lateral direction and parallel to a floor surface.

18. The method of claim 17, further comprising:

providing a first cue to a user that the calibration tool is located at the predetermined distance from the object in the longitudinal direction; and providing a second cue to the user that the calibration scan field is positioned properly with respect to the alignment member of the calibration tool.

19. The method of claim 14, wherein adjusting a position of the sensor such that at least one parameter of the calibration scan field is positioned properly with respect to an alignment member of the calibration tool comprises adjusting the sensor such that first and second lateral inner edges of the calibration scan field are located laterally outwardly from respective first and second lateral sides of the alignment member.

20. The method of claim 14, wherein adjusting the position of the sensor comprises adjusting a yaw position of the sensor.

* * * * *